United States Patent [19]

Morizane et al.

[11] Patent Number: 5,131,977
[45] Date of Patent: Jul. 21, 1992

[54] BASE PLATE FOR RECORDING DISC AND A METHOD FOR ITS MANUFACTURE

[75] Inventors: Toshinori Morizane, Tokyo; Yuko Yoshida, Kesennuma; Koichi Awazu, Kawaguchi, all of Japan

[73] Assignees: C. Itoh & Co., Ltd., Osaka; Toshinori Morizani, Tokyo, both of Japan

[21] Appl. No.: 462,385

[22] Filed: Jan. 9, 1990

[30] Foreign Application Priority Data

Oct. 2, 1989 [JP] Japan .................. 1-257437

[51] Int. Cl.⁵ ............................. B44C 1/22
[52] U.S. Cl. ...................... 156/646; 156/654; 156/663; 156/665; 428/64; 428/65; 428/694; 428/913
[58] Field of Search ............ 428/64, 65, 694, 913; 156/625, 646, 654, 663, 665

[56] References Cited

FOREIGN PATENT DOCUMENTS 0310029 4/1989 European Pat. Off. ............ 428/694

*Primary Examiner*—Patrick J. Ryan
*Assistant Examiner*—Elizabeth Evans
*Attorney, Agent, or Firm*—Armstrong & Kubovcik

[57] ABSTRACT

Herein disclosed is a method for manufacturing a base plate for a recording disc, which comprises steps of polishing the surface of the base plate of glass or aluminum, thereafter dispersing uniformly micro-crystals on the polished surface to form a portion where the micro-crystals are in contact with said polished surface, and subjecting the base plate to etching treatment with an etching agent in a gas phase or a liquid phase. Also disclosed is a base plate for a recording disc, which is obtained by uniformly dispersing micro-crystals on the surface of the base plate and subjecting the same to etching treatment, said base plate having very fine convexities and concavities on its surface.

4 Claims, 4 Drawing Sheets

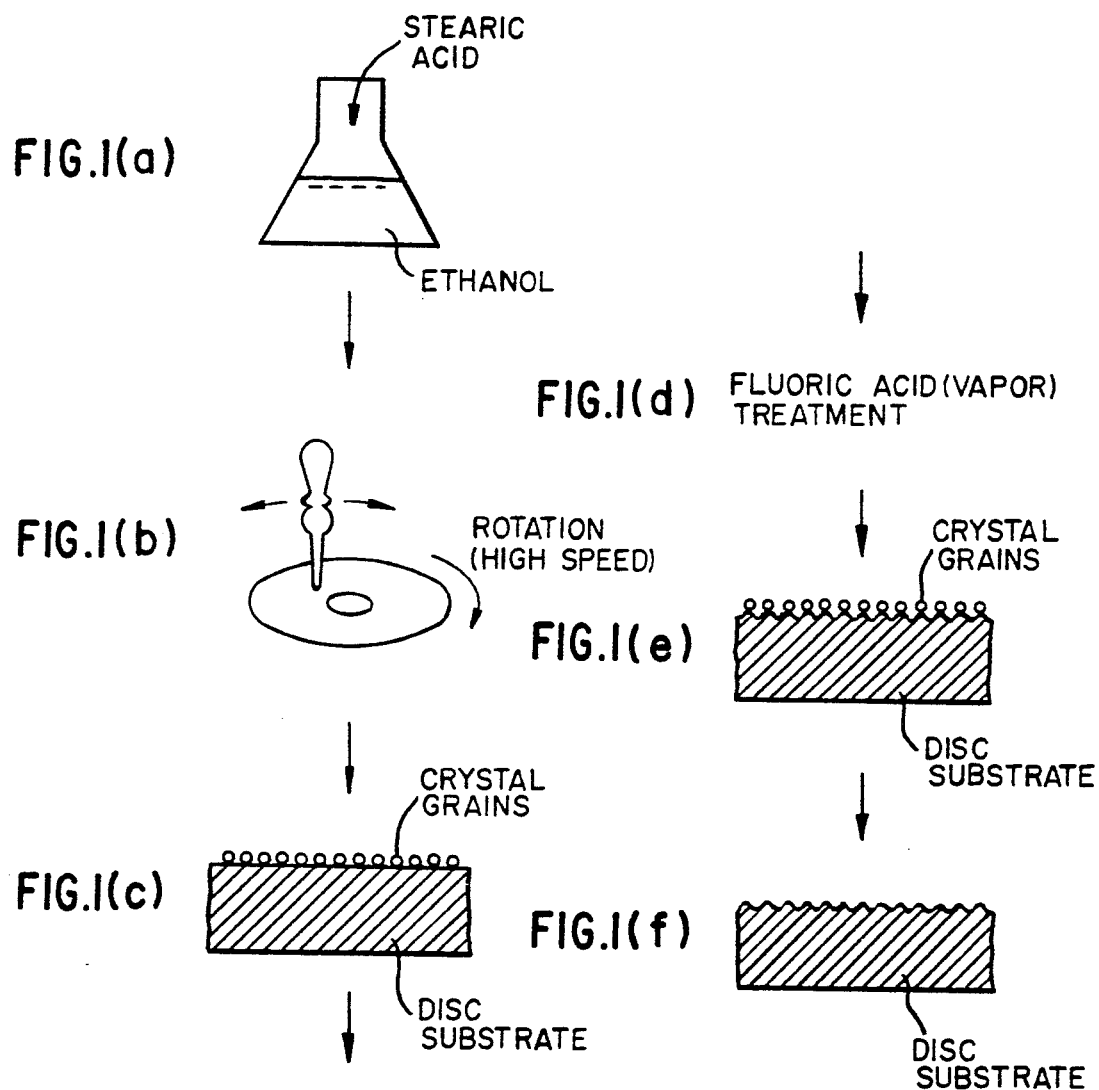

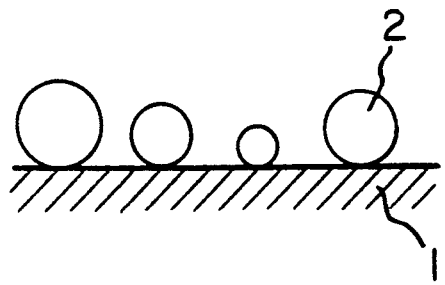
FIG.2(a)
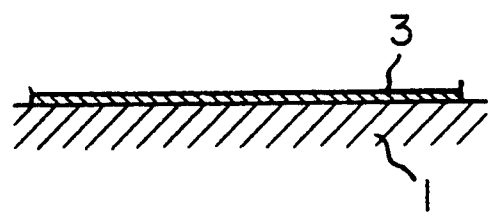
FIG.2(b)
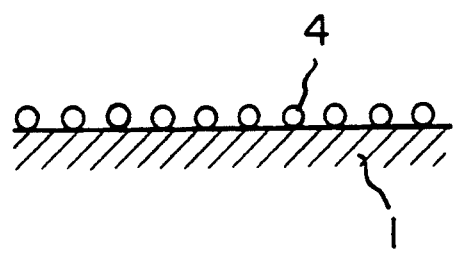
FIG.2(c)
FIG.3

BASE PLATE FOR RECORDING DISC AND A METHOD FOR ITS MANUFACTURE

BACKGROUND OF THE INVENTION

1. Field of the Invention

This invention relates to abase plate to be used as a recording disc, on which a recording medium is maintained. More particularly, it is concerned with a method for manufacturing a base plate of a glass material for the recording disc to hold thereon a high density recording medium such as magnetic recording medium, etc., and also to such base plate for the recording disc produced by the method.

2. Description of Prior Arts

In the field of magnetic recording, a hard magnetic disc having high recording density comprises a base plate with a flat and smooth surface and a recording medium of high saturated magnetic density, for example, a magnetic metal film such as Co-Cr, Co-Ni, etc., placed on the base plate. This type of recording disc has its own problems such that, since its surface is extremely flat and smooth, there takes place absorption between the magnetic head and the recording medium due to intervention of moisture in the air which results in the crushing of the magnetic head. With a view to solving this problem of head crush or "micro-tribiology", there have so far been adopted various methods for lowering the frictional coefficient of the disc surface, such as slightly oxidizing the surface of the magnetic thin film of, for example, Co-Cr; or placing a solid lubricating material (e.g., carbon film) or a liquid lubricant on the surface of the base plate; or increasing surface coarseness of the base plate by subjecting it to the texturing treatment (a treatment to increase the surface coarseness of the base plate) through tape lapping or polishing. Such treatments are generally called "mechanical texturing".

The abovementioned mechanical texturing, however, has its disadvantage such that, due to occurrence of burrs, etc., or irregular surface conditions, etc., there is a large partial difference in the surface coarseness (Ra) of the base plate with the consequence that it is easily scratched during sliding of a magnetic head on it. On account of such large difference in the surface coarseness, it is not possible to bring the magnetic head sufficiently closer to the magnetic recording medium, which not only makes it difficult to realize the low buoyancy of the magnetic head required for effecting the high density recording, but also poses a problem on its CCS-resistant property. As an expedient for solving such problem, it has been admitted that the chemical texturing treatment, as disclosed in Japanese Patent Application No. 62-243074 is useful. The base plate for the recording disc, which has been subjected to this treatment, is very small in its variations in its frictional coefficient due to continuous sliding of the magnetic head.

The present invention proposes an improved texturing technique on the base plate for the magnetic recording disc, by which uniform and regular convexity and concavity are formed on the surface of the base plate.

SUMMARY OF THE INVENTION

It is therefore an object of the present invention to provide an improved method for manufacturing a base plate for a recording disc, from which the abovementioned problems have been removed.

It is also another object of the present invention to provide a base plate for the recording disc free from such disadvantage, as manufactured by the method.

According to the present invention, in one aspect of it, there is provided a method for manufacturing a base plate for a recording disc, which comprises steps of: polishing the surface of the base plate of glass or aluminum; thereafter dispersing uniformly micro-crystals on the polished surface to form a portion where the micro-crystals are in contact with the polished surface; and subjecting the base plate to etching treatment with an etching agent in a gas phase or a liquid phase.

According to the present invention, in another aspect of it, there is provided a base plate for a recording disc, which is obtained by uniformly dispersing micro-crystals on the surface of the base plate and subjecting the same to etching treatment, the base plate having very fine convexities and concavities on its surface.

The foregoing objects, other objects as well as specific composition of the base plate for the recording disc, its treatment conditions, the etching agents to be used for this purpose, and so on according to the present invention will become more apparent and understandable form the following detailed description thereof, when read in conjunction with the accompanying drawing showing the measured results of the preferred examples thereof.

BRIEF DESCRIPTION OF THE ACCOMPANYING DRAWING

FIG. 1(a)–(f) is an explanatory diagram showing process steps for practicing the method of manufacturing the base plate for the recording disc according to Example 1 of the present invention;

FIGS. 2(a), 2(b) and 2(c) are respectively cross-sectional views showing the surface conditions of the base plate for the recording disc according to the method of manufacturing of the present invention as described in Example 4:

FIG. 3 is a plan view showing the surface conditions of a conventional base plate for the recording disc;

DETAILED DESCRIPTION OF PREFERRED EMBODIMENTS

Figure 4:
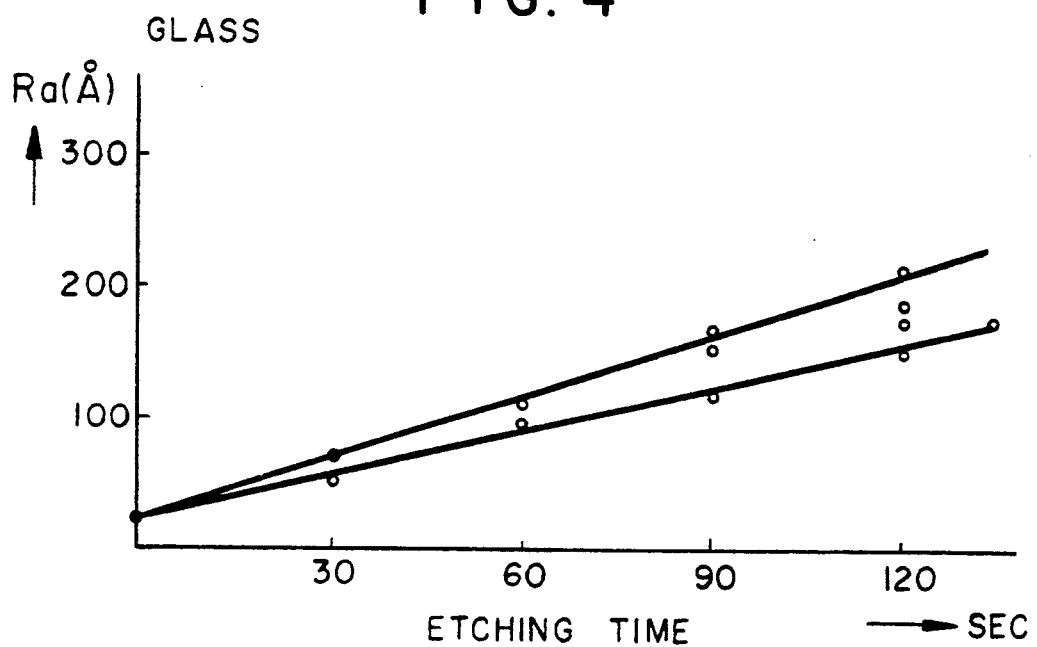
FIGS. 4, 5, 6 and 7 are respectively graphical representations showing a relationship between the etching time and the surface coarseness (Ra) of the base plate in the Examples.

The base plate for the recording disc of the present invention may be made of glass or aluminum. Of these two, the base plate of glass series has high hardness, hence it has particularly favorable results as the base plate for the recording disc which requires chemical-resistant property and wear-resistant property.

In the state of micro-crystals being uniformly dispersed on the surface of the base plate (with a degree of surface-polishing, or surface coarseness (Ra) of from 10 Å to 50 Å), the base plate has, on its surface, uniformly distributed portions, the one with the micro-crystals being in contact with the base plate; and the other with the micro-crystals not being in contact with the base plate. On account of this, there are formed local spaces among the adjacent micro-crystals. In this state, when the etching treatment is effected on the surface of the base plate, the above-mentioned non-contacted portion has a higher etching rate than the above-mentioned contacted portion with the consequent formation of the convexities and concavities on the surface of the base plate. The micro-crystals should be removed, if and when they are not extinguished during the etching treatment.

This etching treatment may be done appropriately by a method of immersing the base plate in an etching liquid, or a vapor phase method, in which the base plate is etched in a vapor of the etching agent.

Depth and space interval of the very fine convexities and concavities to be formed on the surface of the base plate can be controlled by various factors such as the composition of the base plate, the dispersed state of the micro-crystals, and the kind, concentration, etc. of the etching agent.

Since the base plate for the recording disc made of glass has high hardness, it is not necessary to harden its surface. When the space intervals among the convexities and concavities are lager, it is recommendable to apply a rigid coating material such as, for example, Cu, Sn, Ni, Zn, NiO, Ni-Sn, and others by a coating treatment (the electrolytic plating or sputtering), thereby adjusting the space intervals. In this case, since the rigid coating material forms a film following the convexities and concavities on the surface of the base plate, the two-dimensional micro-structure of the convexity and concavity on its surface can be maintained as it is.

On the surface of the thus treated base plate, there is formed a film of high density magnetic recording medium such as, for example, Co-Cr, Co-Ni, and so on by the sputtering method or the electrolytic plating method, which is followed by coating a protective film on this film of the magnetic recording medium, whereby the magnetic recording body, i.e., the magnetic disc is completed. Depending on necessity, a liquid lubricant may be held in the convex and concave portions on the surface of the base plate.

Since the surface of the base plate for the recording disc has such micro-structure as mentioned above, rotation of the base plate for the disc causes air turbulence (inflow of air from all directions) on the surface of the base plate, which constitutes buoyancy resistance to the magnetic head. On account of this, the magnetic head can be maintained with a very small clearance between it and the surface of the base plate without bringing about undesirable crushing of the magnetic head.

It is also feasible that the above-mentioned recording medium is first applied onto the disc plate, and then very fine convexities and concavities are formed on the surface of the recording medium.

With a view to enabling those persons skilled in the art to put the present invention into practice, the following preferred examples of the method of manufacturing the base plate for the recording disc according to the present invention are presented. It should be understood, however, that these examples are illustrative only and not so restrictive, and that any changes and modifications may be made by those persons skilled in the art within the ambit of the present invention are recited in the appended claims.

As the base plate for the recording disc, the following two kinds were used.

Base Plate A: the following glass composition was used, although it was also possible to use the glass base plates of the compositions as disclosed in Japanese Laid-Open Patent Application No. 64-201043 and Japanese Patent Application No. 63-62970, respectively:

62.4% by wt. of $SiO_2$, 18.1% by wt. of $R_2O$, 0.1% by wt. of CaO, 11.5% by wt. of ZnO, 0.6% by weight of $TiO_2$, 2.9% by wt. of $Al_2O_3$, 2.9% by weight of RO, 1.1% by wt. of $B_2O_3$, 0.3% by wt. of $Sb_2O_3$, and 0.2% by wt. of $As_2O_3$ (where RO represents alkaline earth metal oxides, and $R_2O$ denotes alkali metal oxides).

The abovementioned base plate A was polished its surface to a surface coarseness (Ra) of 20 Å, and then washed and dried.

Base plate B: an aluminum base plate which was treated with Ni-P plating as an under-layer, and then its surface was polished to a surface coarseness (Ra) of 20 Å.

EXAMPLE 1

The base plate for the disc was manufactured by dispersing micro-crystals of stearic acid [$CH_2(CH_2)_{16}COOH$] for the texturing treatment. For the base plate, the abovementioned base plates A and B were both used. The method for manufacturing the base plate is shown diagrammatically in FIG. 1.

a) Stearic acid was saturated in ethanol to an extent that it did not become oversaturated (FIG. 1(a)).

b) The base plate was mounted on a spinner, and the abovementioned solution was applied on it, while rotating the spinner (FIG. 1(b)). Instead of using the spinner, a method for dipping the base plate in the solution and then pulling it up (at a pull-up rate of 20 cm/min) is also useful. In the course of evaporation of ethanol from this saturated solution, crystals of stearic acid were deposited. Since ethanol had high rate of evaporation, stearic acid did not grow into crystals so quickly, hence it remained on the base place in the form of micro-crystals. It was observed that the higher the concentrations of the saturated solution was, the more compact (100 Å to 500 Å) became the crystals of the stearic acid to remain on the base plate.

c) The crystal grains of stearic acid were adhered onto the surface of the base plate in the state of their being uniformly dispersed, as shown in FIG. 1(c).

d) Then the etching treatment was effected. The etching could be done either by the method of dipping the base plate in hydrogen fluoride water or hydrogen fluoride acid, or the method of treating the base plate in the vapor of hydrogen fluoride or hydrogen fluoride acid. In this Example 1, the former method was employed. By the way, the latter method exhibited no peeling from the base plate of the crystals adhered onto it, hence, from the point of processing, the latter etching method could be effected relatively easily.

For the base plate A, a solution composed of concentrated HF and water at a mixture ratio of 1 : 40 was used as the etching liquid. It may also be possible to use a solution composed of concentrated HF, concentrated $H_2O_2$, and water at a mixing ratio of 1 : 8 : 32. For the base plate B, a solution composed of concentrated HCl and water at a mixing ratio of 1 : 50 was used as the etching liquid.

Into each of these etching solutions held in a Teflon vessel and kept at a normal temperature, the base plates A and B were immersed.

e) After the etching treatment, supersonic cleaning in boiling water was effected on the base plate, then it was dried in isopropyl alcohol (IPA) vapor or furon vapor. The surface structure of the base plate in its cross-section was as shown in FIG. 1(e), where convexities and concavities were formed, the convex portions being formed where the crystals of stearic acid were adhered onto the base plate, and the concave portions being formed where the crystals were not adhered on it.

f) Crystals of stearic acid adhered onto the surface of the base plate were removed by washing with ethanol. As the results, the convexities and concavities were found to have been formed on the surface of the substrate, as shown in FIG. 1(f).

Figure 5:
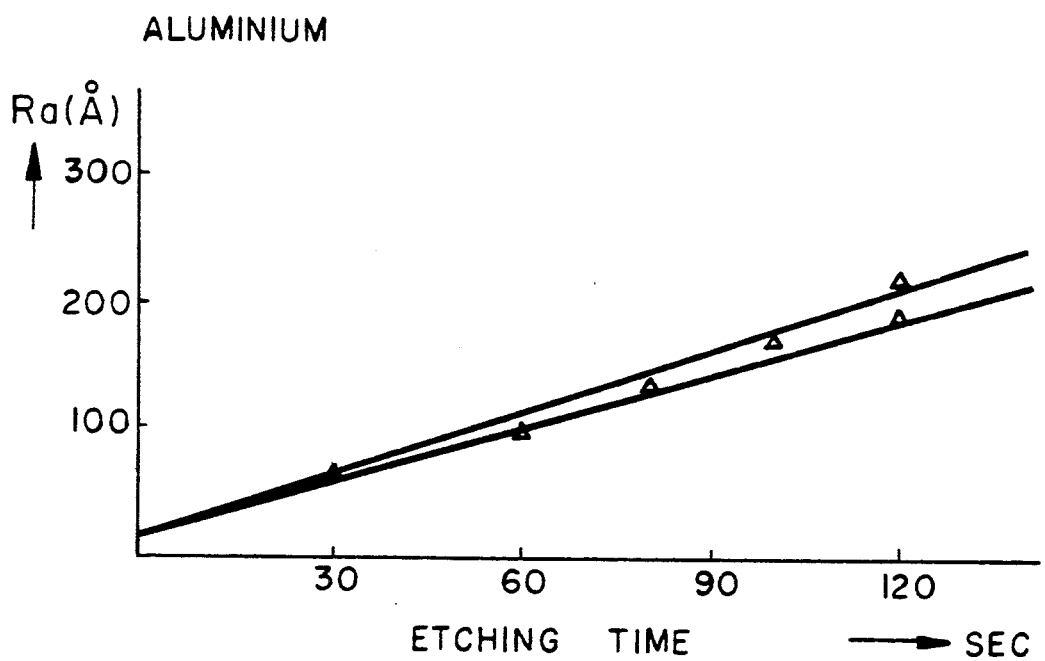

FIG. 4 indicates a relationship between the etching time and the surface coarseness (Ra) in the abovementioned etching treatment for the base plate A, and FIG. 5 shows such relationship for the base plate B (in the etching time of up to and including five minutes, the surface coarseness (Ra) was proportional to the etching time). While a practical surface coarseness (Ra) is upto and including 5,000 Å, an appropriate surface coarseness for the base plate for the recording disc, which has been subjected to the texturing process should be in a range of from 50 Å to 500 Å.

In case the base plate A was subjected to the etching treatment without going through the abovementioned steps a), to c), its surface indicated the pattern as shown in FIG. 3 (observation through an optical microscope). In this case, there can be seen no uniform convex and concave structure as obtained in this Example 1.

EXAMPLE 2

This example shows a case of manufacturing the base plate for the recording disc by first forming a film of a magnetic recording medium on the surface of the base plate, followed by effecting of the texturing treatment onto the surface of the thus formed film of the recording medium.

As the material for the base plate, the base plate A was used, the surface of which was polished to its surface coarseness (Ra) of 20 Å, and then magnetic films of Cr and CoNiCr, as the recording medium, were sequentially formed on it. Thickness of the Cr film was 3,000 Å, while that of CoNiCr was 600 Å. The surface coarseness (Ra) of the magnetic film was 25 Å.

As the result of effecting the texturing treatment on this base plate by uniform dispersion of the micro-crystals of stearic acid in the same manner as in Example 1 above (etching time of 45 sec.), there could be obtained, on the surface of the magnetic film, the convexities and concavities with the surface coarseness (Ra) ranging from 80 Å to 90 Å. Since the surface coarseness (Ra) was 60 Å, when the etching time was 30 seconds, the etching time and the surface coarseness (Ra) were in the proportional relationship.

EXAMPLE 3

This example shows a case of manufacturing the base plate for the recording disc by uniform dispersion, on both base plates A and B, of solid silica obtained from a liquid phase through the sol-gel method.

The sol-gel method is a technique of producing solid silica from a liquid phase by hydrolysis and dehydration polycondensation of metal alkoxyd. The texturing treatment in this example is an application of this technique, by which a very fine convex and concave structure or spatial structure can be formed on the flat and smooth surface of the base plate for the recording disc.

The reaction of hydrolysis and dehydration polycondensation of silicon alkoxyd is represented by the following equation.

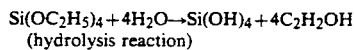
(hydrolysis reaction)

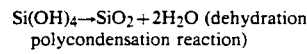
(dehydration polycondensation reaction)

In actual reaction, silicon alkoxyd and water are reacted directly by their mixing. Since, in this case, silicon alkoxyd is insoluble in water, both are reacted by addition of ethanol as their common solvent.

This reaction takes a different form of production by controlling the pH value of the reaction system. In case the pH value in the reaction system indicates acidity, the crystal structure of silica exhibits a planar structure. On the other hand, when the pH value of the reaction system indicates alkalinity, the crystal structure of silica does not take the planar structure, but the silica crystals sediment in the form of very fine crystal grains. For the purpose of the texture formation, the silica gel formed under the alkaline reaction system is effective. By controlling the pH value of the reaction system, the size of the silica grains can be regulated. In this example, tetraethoxysilane (TEOS) [Si(OC$_2$H$_5$)$_4$] was used as the source of silica, and ethanol as the common solvent.

Water used for the reaction was made alkaline (pH value of from 8 to 9) by adding a very small quantity of hydrazine. TEOS, ethanol and water at their respective ratio of 1 : 1.5 : 1 were sufficiently mixed, and left as it was, whereupon granular silica was produced and the solution became white-turbid. In order to coat the base plate with a uniform and thin film of silica (a solution film containing silica dispersed therein), it is important to note how tetraethoxysilane (TEOS) with poor adhesivity is to be applied onto the base plate. To cope with this problem, nitrocellulose was dissolved in ethanol at a ratio of 5% with successful result in such uniform coating. This uniform dispersion was done in the same manner as in Example 1 above. That is, the coating liquid was spun onto the base plate at a normal temperature to form the abovementioned solution, whereupon ethanol was promptly evaporated. Then, the binder was decomposed by heating the same for five minutes at a temperature ranging from 200° to 220° C., thereby leaving granular silica. The grain size of silica was in a range of from 100 Å to 200 Å. When the dipping was conducted in this example, there could be obtained a coating thickness of from 100 Å to 300 Å by setting the pull-up at 20 cm/min. After the decomposition of the binder in the same manner as mentioned above, there were left the granular silica. The etching treatment subsequent to the abovementioned steps followed the same procedure as in Example 1 above. The surface coarseness (Ra) of the resulted film was in a range of from 50 Å to 500 Å. The relationship between the etching time and the surface coarseness was substantially same as in Example 1 above.

EXAMPLE 4

In the following, explanations will be given as to an example, wherein gold was sublimated on the base plate by evaporate deposition to thereby disperse micro-crystals of an oxide of gold on its surface.

It was observed that favorable dispersion, onto the surface of the base plate, of a metal material having low crystallinity and being readily sublimated with heat was attained, provided in particular, that the metal material was oxidized with oxygen in the atmosphere to become an oxide of the metal. The vapor deposition method of the metal oxide is a kind of chemical vapor deposition (CVD). In general, when a metal is to be evaporatively deposited, the atmosphere should be the vacuum of $10^{-3}$ Torr or below. When the metal in a basket is heated under the vacuum condition, the metal therein becomes molten and evaporated to form a thin film on the base plate as the target. However, when the degree of vacuum is not sufficient, the metal reacts with oxygen and is deposited on the base plate in the form of an oxide. The diameter of the oxide to be deposited on the base plate is considered to be dependent on the degree of vacuum. If the degree of vacuum is too low, no uniform dispersion of the metal oxide can be attained, as shown in FIG. 2(a). On the other hand, if the degree of vacuum is too high, the metal thin film (3) becomes very compact as shown in FIG. 2(b), with the consequent inability to obtain the desired state of dispersion of the micro-crystals. By properly regulating the degree of vacuum, there can be attained a state where the grains of oxide crystals (4) in a uniform grain size are evenly dispersed on the surface of the base plate (1) as shown in FIG. 2(c). Since the base plate and the metal oxide as deposited on it had no contact and bonding strength whatsoever between them, and was undurable against the liquid phase etching, the vapor-phase etching was done.

In this example, the pressure in the vacuum container was reduced to $10^{-1}$ to $10^{-2}$ Torr to carry out the vapor deposition of gold (Au) under the condition where oxygen is present within the vessel. In this way, there was deposited micro-crystals of $Au_2O$ on the surface of the base plate. This base plate was then subjected to the vapor-phase etching in a vapor atmosphere of HF, and $Au_2O$ remaining on the base plate was removed with aqua regis, followed by washing and drying. The surface coarseness (Ra) of the base plate was in a range of from 170 Å to 500 Å. The relationship between the etching time and the surface coarseness (Ra) was substantially same as Example 1 above.

EXAMPLE 5

In this example, a metal was vapor-deposited on the base plate under a high vacuum condition, followed by its oxidation treatment. As one example, explanations will be given as to a case, wherein Sn and Bi were used as the metal. Besides these, Mo, Zr, Cu, A l, etc. were also useful.

By sputtering or vapor-deposition, a film of 50 Å to 200 Å was formed on the surface of the base plate. The film as formed by the sputtering method was found flat and smooth. However, the film as formed by the vapor-deposition indicated a state where convexities and concavities existed. In either case, when the coated film was heated in the air at a temperature ranging from 100° C. to 300° C. for a time period of from one to four hours, the metals were converted to $Bi_2O_3$ and $SnO_2$, respectively. By the oxidation reaction, the metal oxides took a granular form having a grain size of from 100 Å to 400 Å. The shape of the grain of the metal oxides and their adhesivity are determined by the oxidizing conditions.

The grains of the metal oxide exhibited strong adhesivity, and formed an excellent texture even under this state, hence the base plate is useful for the purpose of the recording disc without subjecting the base plate to the etching treatment. However, since there took place an occasion where the grains were recognized to change the adhesive strength and varied their shape (in particular, at the time of the high temperature treatment of the magnetic film), it was necessary to carry out the texturing treatment onto the base plate for the recording disc by the direct etching in the space among the grains with use of an acid solution or acid vapor. The method of treatment followed that of Example 1 above. The surface coarseness (Ra) was 500 Å or below. The relationship between the etching time and the surface coarseness (Ra) was substantially same as Example 1 above.

EXAMPLE 6

In this example, the base plate for the recording disc was manufactured by means of a photoresist and the sol-gel method. The texturing treatment could be done by use of a positive type photoresist for producing semiconductor IC and TEOS, wherein $SiO_2$ grains were deposited on the photoresist by the dehydration polycondensation reaction, followed by pre-baking, after which $SiO_2$ was removed by decomposition with use of diluted hydrogen fluoride water and simultaneously etching the surface of the glass plate. A mixture of the positive type photoresist (4.5 cp at 25° C.), TEOS, ethanol, and alkaline water (containing hydrazine or $NH_4OH$) at a ratio of 2 : 1 : 1.5 : 1 was subjected to dehydration polycondensation reaction (viscosity of 3 to 4 cp). In the case of dipping the base plate into the etching liquid, the pull-up rate was set at 20 cm/min., thereby carrying out the film-forming to a thickness of from 100 Å to 500 Å.

Figure 6:
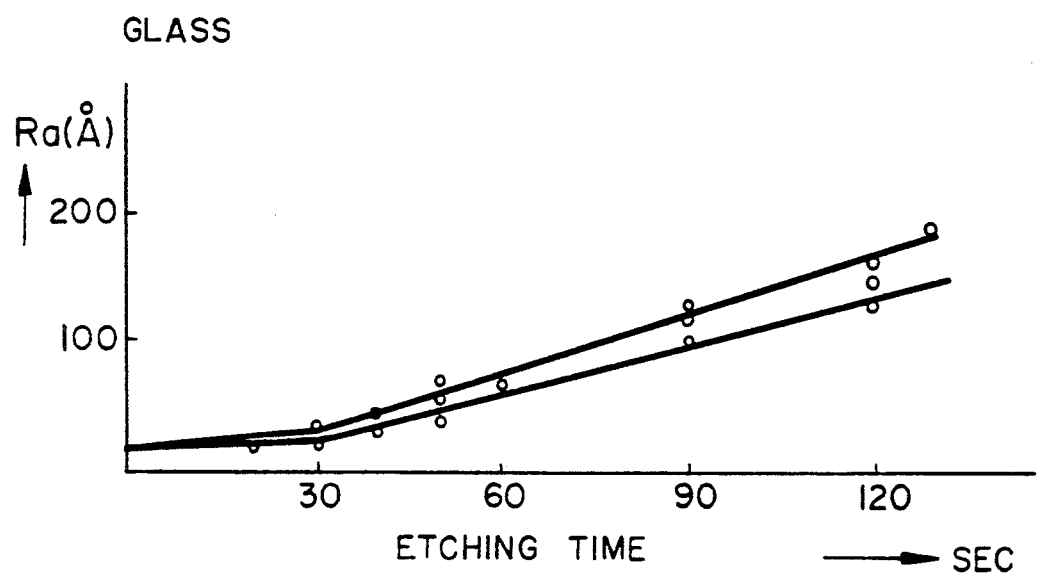
Figure 7:
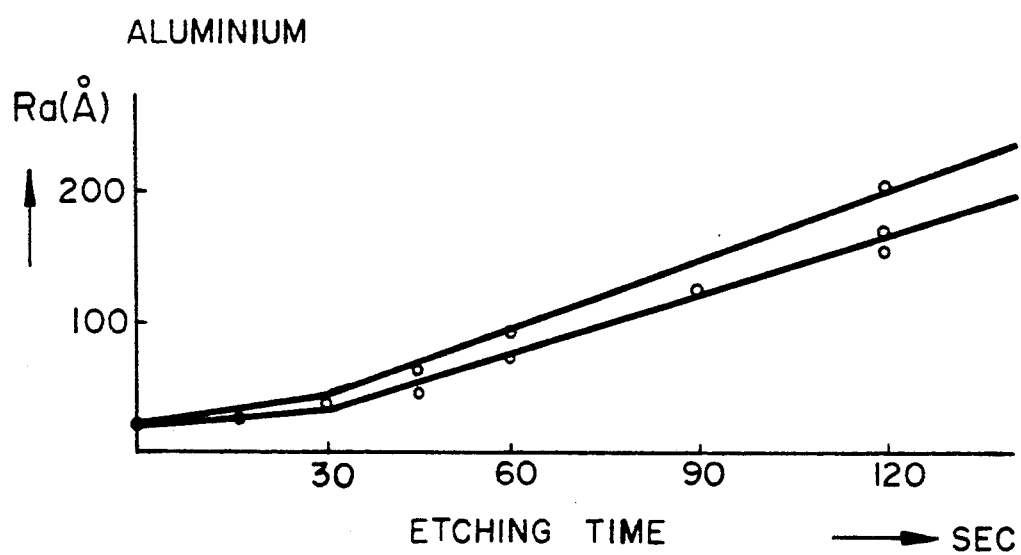

The pre-baking was done at a temperature of from 80° C. to 85° C. for a time period of from 10 to 30 min. by circulation of hot air. When the film surface was subjected to slight etching with alkaline solution (mixture of water and $NH_4OH$ at a mixing ratio of 1 : 10 (% by volume)), the photoresist film is etched and a part of the $SiO_2$ grains became exposed to the surface. Thereafter, following the procedures in Example 1 above, the etching treatment was carried out on the surface of the base plate. The remaining film on the surface of the base plate was removed by dipping it in acetone, alcohol, methanol, ethanol, DMF, Cellusolve, and other solvents for one to two minutes, or by means of a plasma machine (oxygen plasma). The surface coarseness (Ra) was in a range of from 50 Å to 500 Å. FIG. 6 shows the relationship between the etching time and the surface coarseness (Ra) for the base plate A, and FIG. 7 shows the same relationship for the base plate B.

Since the base plate for the recording disc according to the present invention is manufactured in accordance with the above-described method, and has the very fine and uniform granular patterns evenly formed on the surface of the base plate, it has become possible to solve the points of problem in the conventional base plate for the recording disc, as described in the foregoing.

Moreover, since the grain size, inter-crystalline distance among the grains, the depth of the convexities and concavities on the surface can be easily controlled by appropriate setting of the base plate composition, the kinds of thin film for the masking, the quality of the film, its film forming-conditions, and the etching conditions, the schedule control and the quaintly control of the base plate are easy, hence the method of the present invention is the best suited for the industrial mass-production.

What we claim is:

1. A method for manufacturing a base plate for a recording disc, comprising the steps of:
   polishing the surface of said base plate, said base plate being one of glass and aluminum;

uniformly dispersing micro-crystals on said polished surface to form a portion where said micro-crystals are in contact with said polished surface; and subjecting said base plate to etching treatment with an etching agent in one of a gas phase and a liquid phase.

2. A method for manufacturing a base plate for a recording disc, comprising the steps of:

polishing the surface of said base plate, said base plate being one of glass and aluminum;

forming a film of a magnetic recording medium on said polished surface;

uniformly dispersing micro-crystals on said polished surface to form a portion where said micro-crystals are in contact with said polished surface; and subjecting said base plate to etching treatment with an etching agent in one of a gas phase and a liquid phase.

3. A method for manufacturing a base plate for a recording disc as set forth in any one of claim 1 or claim 2, wherein said step of uniformly dispersing said micro-crystals on said base plate includes a step of dropping a solution containing said micro-crystals of one of an organic compound and an inorganic compound dispersed thereinto onto the surface of said base plate rotating at a high speed.

4. A method for manufacturing a base plate for a recording disc as set forth in any one of claim 1 or claim 2, wherein said step of uniformly dispersing said micro-crystals includes the step of uniformly dispersing crystals of one of metals and oxides of metals on the surface of said base plate by one of evaporation and sputtering.

* * * * *